Patented Nov. 28, 1922.

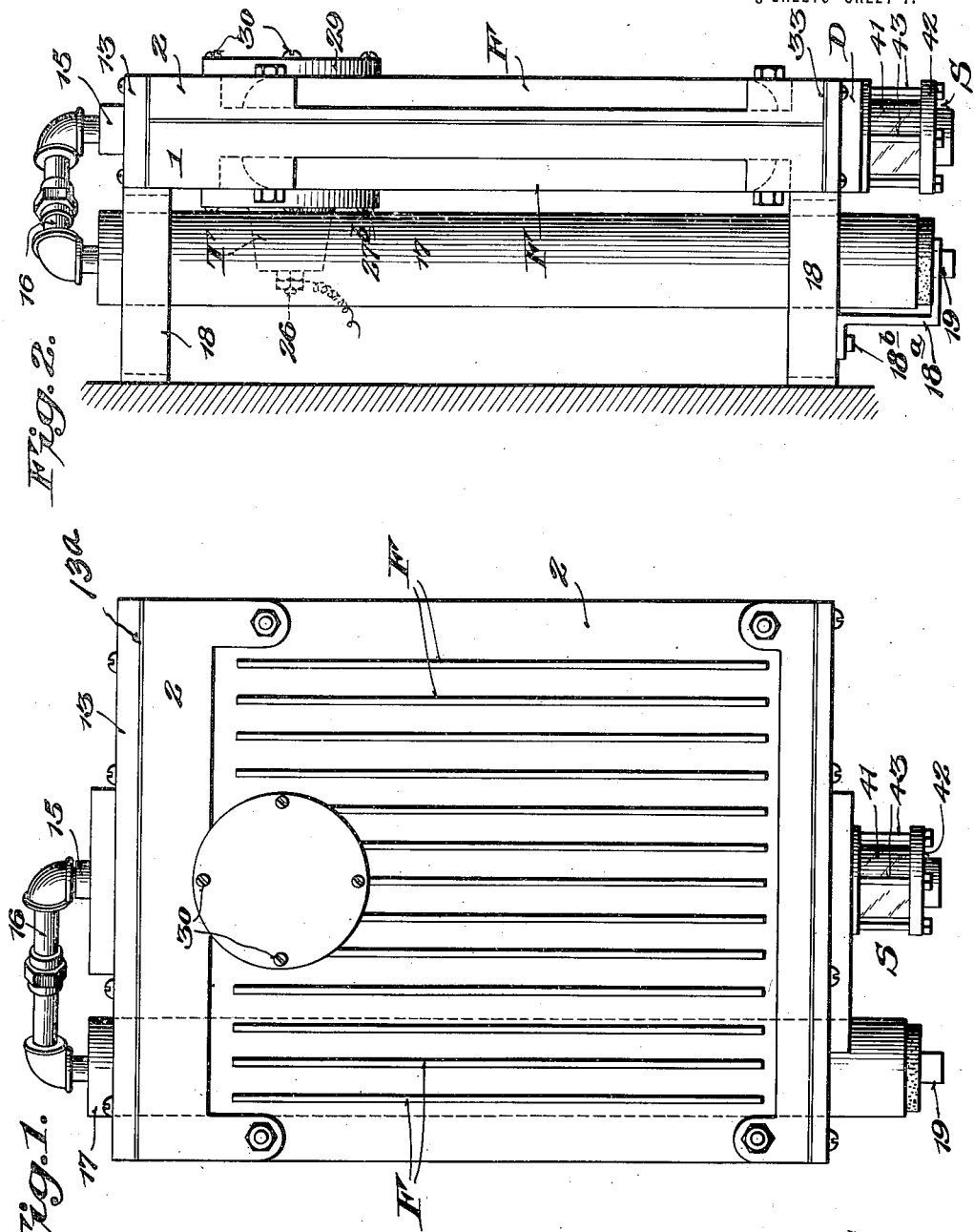

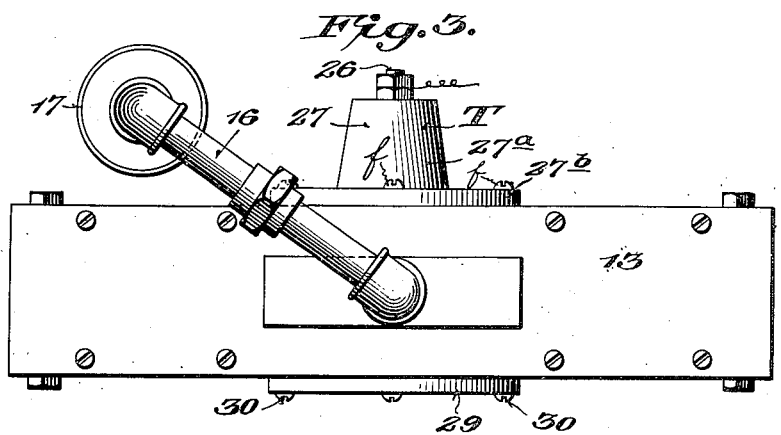
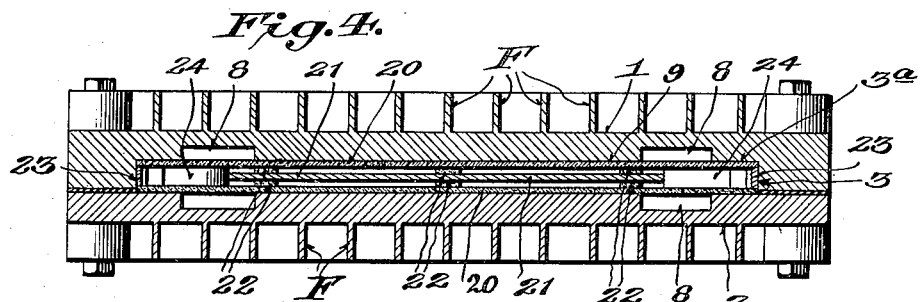
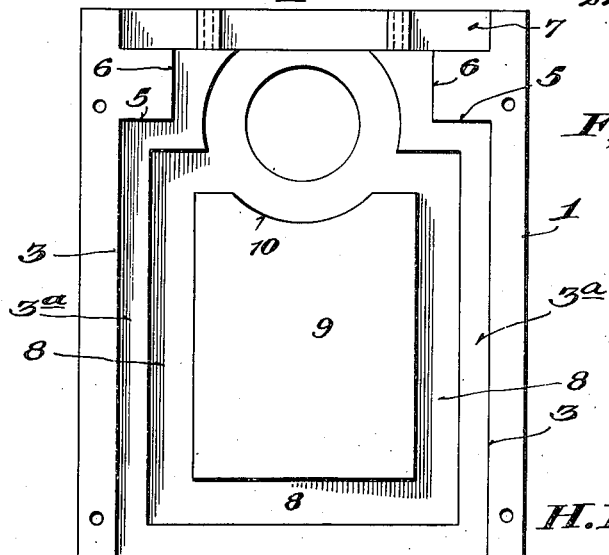

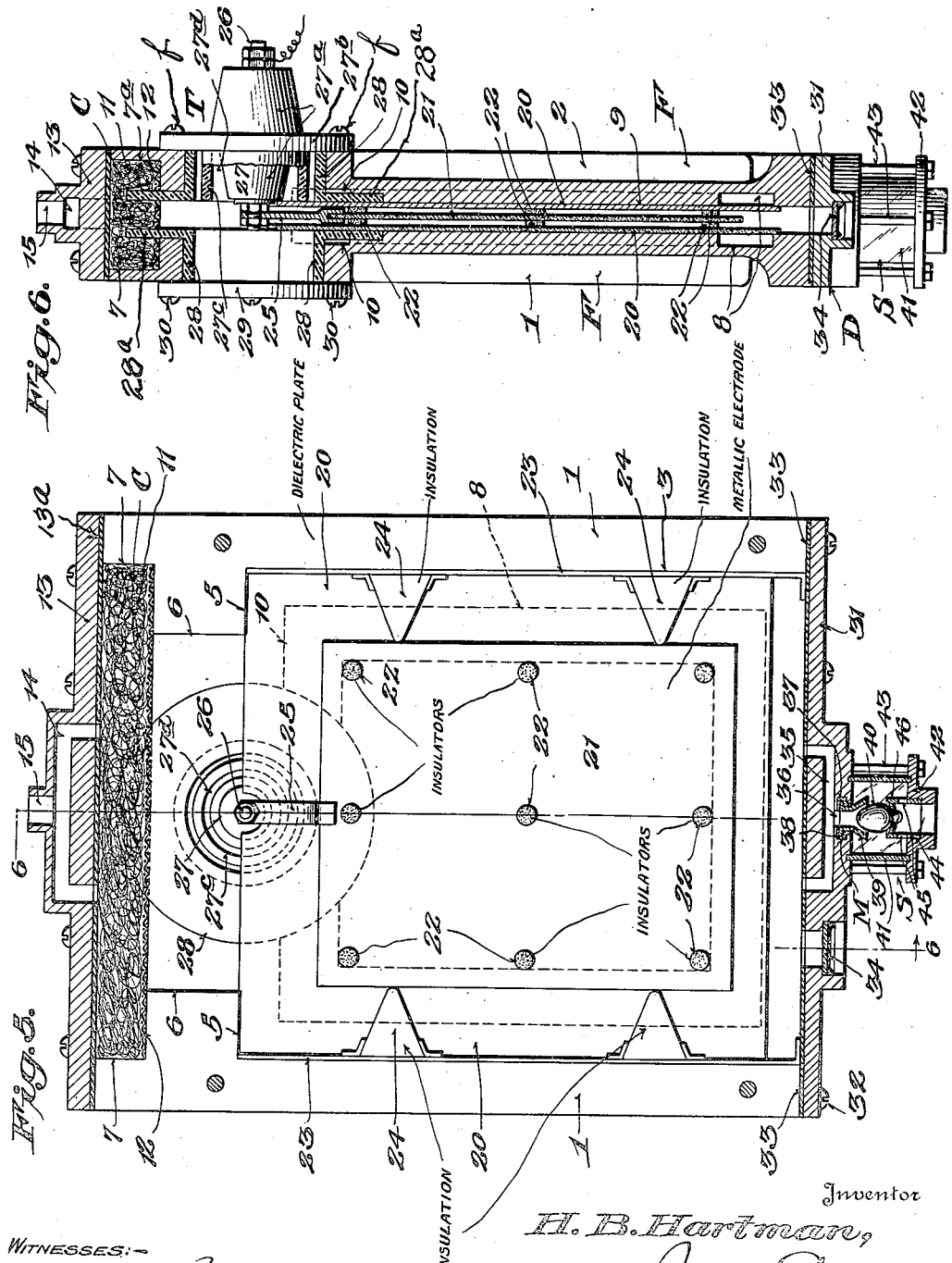

1,437,302

UNITED STATES PATENT OFFICE.

HARRY BUXTON HARTMAN, OF SCOTTDALE, PENNSYLVANIA, ASSIGNOR TO ELECTRIC WATER STERILIZER & OZONE COMPANY, OF SCOTTDALE, PENNSYLVANIA, A CORPORATION OF PENNSYLVANIA.

OZONE GENERATOR.

Application filed February 8, 1922. Serial No. 534,992.

*To all whom it may concern:*

Be it known that I, HARRY B. HARTMAN, citizen of the United States, residing at Scottdale, in the county of Westmoreland and State of Pennsylvania, have invented certain new and useful Improvements in Ozone Generators, of which the following is a specification.

This invention relates to an improvement in ozone generators of the type used in connection with water purifying apparatus.

A primary object of the invention is to provide a simple, practical and reliable construction that may be easily manufactured and assembled and which may also be easily maintained and kept in proper operating condition with a minimum expense and attention.

Another object of the invention is to provide a generator casing having removable air intake and ozone delivery doors which facilitate the renewal of the filtering medium arranged within a filtering chamber formed directly in the sections of the casing and also permit facile removal and replacing of the generating plates.

A further object of the invention is to provide novel means for preventing rupturing of the plates by the backing up of water into the generator from the mixing column into which the ozone is discharged to treat the water to be purified. In some installations the arrangement is such that water frequently backs up into the connections leading to the ozone discharge outlet if the water succeeds in reaching the generating plates the same are seriously damaged. In order to prevent this the present invention proposes to provide a sealing unit which operates to automatically close the ozone discharge outlet in the event water backs up in the connections.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:

Figure 1 is a front elevation of the improved generator unit.

Figure 2 is a side elevation thereof.

Figure 3 is a top plan view.

Figure 4 is a horizontal sectional view.

Figure 5 is a vertical sectional view.

Figure 6 is a vertical cross-sectional view taken on the line 6—6 of Figure 5.

Figure 7 is a detail elevation of the inside face of one of the casing sections.

Similar reference characters designate corresponding parts throughout the several figures of the drawings.

The present construction preferably includes in its organization a casing consisting of a pair of sections 1 and 2 of substantially identical formation and are provided with complemental inside faces so that when they are arranged together, in their assembled relation, they will completely and effectively house and protect the ozone generating instrumentalities.

The casing section 1, for example, is shown in Figure 7 and as will be observed therefrom the inside face is provided with a recess 3 opening at the bottom edge 4 and provided adjacent the upper end of the section with the interior shoulders 5 which provide a restricted clearance 6 communicating with a recess 7 constituting a part of the filtering chamber when the sections 1 and 2 are placed in assembled relation. The wall 3ª of the recess 3 is provided with a continuous insulator groove 8, leaving the central portion 9 of the face to act as a clamping face for the dielectrics of the ozone generating unit. Also the section is provided with an annular depression 10 for receiving the flange of one of the insulators of the terminal unit, as will presently appear.

The inside face of the section 2 is identical with the inside face of section 1 with the exception of the recess 3, as may be observed from Figure 4 of the drawings. Therefore, when the two sections are placed in assembled relation the intaglio portions of one section form a complement to the intaglio portions of the other to provide the necessary spacing for accommodating the ozone generating instrumentalities. The section 2, like the section 1, is provided with a recess 7ª in the top thereof to provide the filtering chamber C which is thus arranged at the upper edge of the assembled casing. And, in order to prevent the cotton or other filtering medium 11 from working its way between the sections, the floor of the chamber is provided with a wire screen or like mesh 12.

As shown in Figures 1 and 4 of the drawings, the exterior faces of the casing sections may be provided with the heat radiating fins F for keeping the sections as cool as possible while the generator is in use.

The filtering chamber C in the upper edge of the casing is closed by the air manifold plate 13 and gasket 13ª, the former having therein the air distributing passage 14 and intake connection 15 which joins with the air inlet pipe 16 leading from a dryer or de-hydrator 17 carried by brackets 18. As shown in Figures 1 and 2 the de-hydrator is preferably a tubular casing having the air intake 19 at its lower end, whereby air may be drawn through the full length of the casing and through the connection 16 to the air intake manifold 14 and thus be thoroughly dried. For the purpose of conveniently mounting the dryer adjacent the generator the brackets 18 may be utilized, the lower bracket 18 being provided with an angular foot member 18ª for engaging with and supporting the lower end of the casing 17. This foot member which may be a casting is secured to the lower bracket 18 by a screw 18ᵇ so that upon the removal of the screw the foot may be also removed to permit the dryer to be drawn through the bottom of the machine. Or, on the other hand if sufficient head room is available above the generator the union in the pipe line 16 may be broken and the dehydrator lifted out of the machine.

As heretofore described the recess 3 in the casing section 1 is open at the edge 4 so that the ozone generating unit may be conveniently slid into position between the assembled plates from the bottom edge of the generator, and, after the plates have been properly arranged in position and connected to the terminal unit T, the ozone delivery door D may be fitted to the bottom edge of the casing to completely close the generating chamber and control the output of the ozone.

Referring to the generating unit it will be observed that the same essentially comprises a pair of dielectric plates 20 which are placed against the faces 9 of the sections and an intermediate metallic electrode plate 21 which is spaced from the dielectrics by the lava buttons 22 or the like to insure communication between the filter chamber C and the ozone delivery door D. Also for the purpose of spacing the dielectric plates and metallic electrode 21 and securing the latter in position, the centering and positioning frames 23 may be employed. These frames lie against the side walls of the recess 3 and carry the substantially triangular spacing members 24, clearly shown in Figure 5.

As will be noted from Figure 6 the dielectric plates 20 completely overlie the groove 8 in the inside face of each section and thereby an insulating air space is formed between the dielectrics and the casing sections. The metallic electrode plate 21 is of less area than the dielectric plates, as clearly shown in Figures 5 and 6, and thus its edges terminate at points within planes defining the width of the grooves 8. The purpose of this construction is to increase the effectiveness of the generating plates by preventing the dissipation of the generating current and also preventing the breaking down or burning away of the edges of the electrode plate 21. This plate 21 of the ozone generating unit is connected by the conductor strip 25 with the central conductor rod 26 carried by the insulator 27 of the terminal unit T.

The terminal unit T above referred to includes the insulator 27 which is of novel construction and the insulating bushings 28 which are of angular cross-section whereby their flange portions 28ª may fit within the recesses 10 formed in the inside faces of the casing sections. As will be observed from Figure 6 the insulator 27 consists of the central conductor holder or body 27ª having the relatively large annular cover flange 27ᵇ, that is intended to be secured to the outer face of the casing section by the fastenings f and also close the opening through which the conductor rod enters the assembled generator casing. The inside face of the flange 27ª carries an offset insulating flange 27ᶜ which forms a pocket 27ᵈ for trapping stray generating flashes which radiate from the terminal inner end of the conductor rod, thereby insuring adequate insulation for the current intended to be fed to the central electrode plate 21. The insulating bushing 28, for the section 1, is closed by a detachable insulating cover disk 29 which may be held in place by the removable fastening screws 30, so that the inner terminal of the conductor rod may be readily accessible upon the removal of the plate 29. Thus, the nuts which clamp the strip 25 to the conductor rod may be adjusted or replaced as required, in installing or replacing the central electrode plate 21 with great facility.

In connection with the ozone delivery door D at the bottom of the casing it will be observed that this door includes a body plate 31 which may be fitted to the bottom edges of the sections 1 and 2 by fastenings 32. Also, to effectively seal the door when placed in position a gasket 33 may be employed. The central portion of the door is provided with an inspection window 34 and ozone delivery manifold 35 having an outlet 36. This outlet is preferably formed with an annular recess 37 for receiving the bead end 38 of a novel funnel member 39 which cooperates with a float valve 40 to automatically seal or close the ozone discharge outlet in event that water from the system backs up into the connections which deliver the ozone. To insure a tight fit between the bead 38 and the keeper groove 37 in which the same is seated a suitable plastic sealing medium M may be flowed around the bead so when it sets or hardens there will be a tight fit between the valve seat and the edges of the door.

The sealing unit designated generally as S and including the funnel 39 and valve 40 constitutes one of the novel and distinctive features of the present invention. As shown in the drawings, particularly Figure 5, it consists of a casing, preferably a glass cylinder 41, whose opposite ends are seated in suitable recesses in the body of the door and the closure cap 42 held to the body of the door by the fastening bolts 43. Normally the sealing valve 40 is unseated with respect to the flared end or seat of the funnel 39 by gravity, and for the purpose of properly supporting the same away from the seat a novel chair is provided. This chair may be in the form of a tubular member 44 having the lateral openings 45 in the side thereof while the top is provided with the seat 46 upon which the bottom of the buoyant valve 40 rests under normal operating conditions. With this arrangement the ozone generated within the casing may be freely drawn through the delivery opening 36 and out of the lateral openings 45 but if water should back-up into the connections to which the ozone is delivered, it will have to flow through the lateral openings in the tubular member 44 and partially fill the chamber formed by the glass ring 41 thus causing float 40 to rise to its seat in the flared portion of the delivery funnel 39.

The general operation of the device is substantially as follows:—

Air is drawn through the dryer or dehydrator 17 through connection 16 into the intake manifold 14 and thence to the filtering chamber C from whence it passes between the electrode plate 21 and dielectrics 20 to the bottom of the casing. From here it makes its way to the manifold 35 of the ozone delivery door D, and thence passes through the delivery funnel 39 into the chamber of the sealing unit S to the delivery connections for use in connection with the mixing unit through the openings 45.

Without further description it is thought the features and advantages of the invention will be readily apparent to those skilled in the art, and it will of course be understood that changes in the form, proportion and minor details of construction may be resorted to, without departing from the spirit of the invention and scope of the appended claims.

I claim:—

1. An ozone generator for water purifying apparatus including a casing having an air inlet at the top of the casing and an ozone outlet at the bottom of the casing, and means for preventing entrance of water into the casing at the ozone outlet.

2. An ozone generator for water purifying apparatus including a casing having an air inlet at the top of the casing and an ozone outlet at the bottom of the casing, and a water seal unit located at the ozone outlet for preventing entrance of water into the casing through said outlet.

3. An ozone generator for water purifying apparatus including a casing having an air inlet at the top of the casing and an ozone outlet at the bottom of the casing, a water seal unit located at the ozone outlet, the said water seal unit including a casing for preventing the entrance of water therein having an outlet, and a float in said casing.

4. An ozone generator including a casing having an air inlet at the top and an ozone discharge outlet at the bottom provided with a valve seat, and a water seal unit for the discharge outlet including a casing having an outlet provided with a valve chair, a float valve adapted to normally seat on the chair and uncover the said ozone discharge outlet and being adapted to seal said outlet if the chamber fills with water.

5. An ozone generator including a pair of complemental casing sections, a terminal unit carried by said casing and consisting of porcelain bushings protecting the metal parts of the casing and an insulator for carrying the conductor rod, said insulator having an annular insulator flange projecting from the inner face thereof, and a metallic ozone generating electrode connected with said terminal unit.

6. An ozone generator including complemental casing sections having an ozone generating unit clamped therebetween, an air filtering chamber formed by complemental recessed portions in the upper edges of the sections, an air intake manifold covering said recess and forming a chamber, and a removable ozone delivery door at the opposite side of the casing.

7. An ozone generator including a pair of complemental casing sections recessed at their upper edge to provide a filter chamber, an air intake manifold secured to said sections and discharging into the filter chamber, an ozone generating unit arranged between the sections, an ozone delivery door fitted to the opposite side of the casing, and a water seal unit carried by the said door.

8. An ozone generator including complemental casing sections having a continuous groove formed in the adjacent faces thereof, an ozone generating unit clamped between the adjacent faces of the sections and consisting of dielectric plates overlying said grooves, and an intermediate electrode plate of less area than the dielectric plates whereby its edge portions terminate within parallel planes defining the limits of said groove.

9. An ozone generator including a casing consisting of spaced apart sections adapted to be clamped together and removable air and ozone manifolds located at opposite edges of said sections.

10. An ozone generator for water purifying apparatus including a casing having an air intake manifold fitted thereto, a wall bracket consisting of members for supporting the ozone generator, an air drier unit engaged and supported by the members of the bracket and connected with the said air intake manifold.

In testimony whereof I hereunto affix my signature in the presence of two witnesses.

HARRY BUXTON HARTMAN.

Witnesses:
MABEL FREEMAN,
MABEL ROSENSTEELE.